March 19, 1957

B. D. ANDREWS 2,785,580

GEAR ASSEMBLY

Filed Oct. 28, 1955

INVENTOR.
Bernard D. Andrews
BY
*M. H. Strickland*
His Attorney

United States Patent Office 2,785,580
Patented Mar. 19, 1957

2,785,580

GEAR ASSEMBLY

Bernard D. Andrews, Rochester, N. Y., assignor to General Motors Corporation, Detroit, Mich., a corporation of Delaware Application October 28, 1955, Serial No. 543,468

8 Claims. (Cl. 74—432)

This invention pertains to a gear assembly, and particularly to a gear assembly including driving and driven gears capable of limited torsional deflection relative to each other.

Heretofore, it has been proposed to incorporate resilient couplings in electric motor driven window lifts wherein the electric motor is stalled when the window is fully raised, fully lowered, or encounters some other obstacle. A gear assembly including such a resilient coupling is disclosed in copending application, Serial No. 486,522, filed February 7, 1955, in the name of Herbert C. Porter, and assigned to the assignee of this invention. The present invention relates to an improved gear assembly for electric window lifts. Accordingly, among my objects are the provision of a gear assembly including driving and driven gears with a resilient coupling therebetween, the resilient coupling having an integral sealing lip; the further provision of a gear assembly including a gear having an elastomeric cushion bonded to an end surface thereof, the gear having integral means preventing the entrance of elastomeric material into the spaces between the gear teeth during the molding process; and the still further provision of a gear assembly including a gear having an elastomeric cushion bonded to an end surface thereof having an integral sealing lip, the gear having integral means for supporting the sealing lip.

The aforementioned and other objects are accomplished in the present invention by forming an integral flange on a gear, which flange closes the gear teeth on one end surface thereof. Specifically, the gear assembly includes a metallic shaft to which a worm gear is drivingly connected by any suitable means, such as splines. The worm gear is restrained against axial movement relative to the shaft by a snap ring, and opposite ends of the shaft are rotatably journalled in a housing. A pinion gear is rotatably journaled on the shaft, and a metallic insert is press fitted onto a flange of the pinion gear so as to abut the side surfaces of the pinion gear teeth. A cushion of elastomeric material is interposed between the worm gear and the insert, the cushion being bonded to both the worm gear and the insert.

In the particular embodiment disclosed herein, the end surface of the gear to which the elastomeric cushion is bonded and the surface of the insert to which the cushion is bonded, are of conical shape so as to equalize the stress imposed upon the cushion during torsional deflection of the pinion gear relative to the worm gear. The worm gear may be composed of any suitable metal or plastic material, such as nylon, and is formed with an integral conical flange which closes the teeth on one end surface of the gear. The gear assembly is disposed in the housing and the elastomeric cushion is formed with an integral sealing lip which is partially supported by the integral flange on the worm gear, the sealing lip engaging the interior of the housing so as to prevent the entrance of foreign matter between the teeth of the worm gear. In addition to supporting the sealing lip, the integral flange on the worm gear prevents the entrance of elastomeric material into the spaces between the teeth of the worm gear during the molding of the cushion between the worm gear and the insert.

Further objects and advantages of the present invention will be apparent from the following description, reference being had to the accompanying drawing wherein a preferred embodiment of the present invention is clearly shown.

Figure 1:
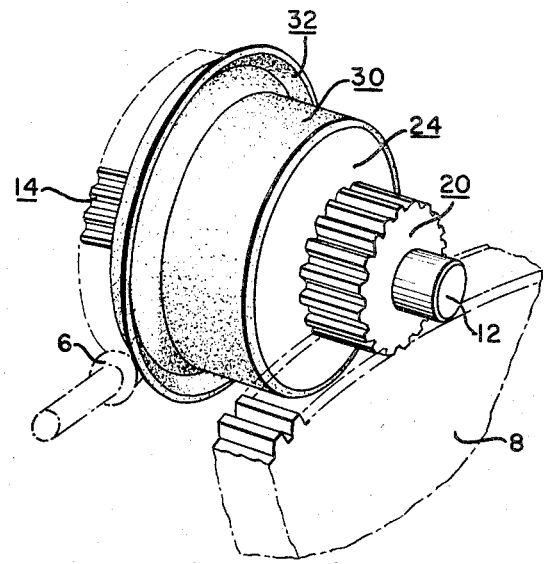
Fig. 1 is an isometrical view of the gear assembly of this invention illustrating the driving worm and the driven sector gear in phantom.

With particular reference to Fig. 1, the gear assembly of this invention is designed particularly for use in window lift mechanism of the general type disclosed in the Simpson Patent 2,317,490, wherein a reversible electric motor is drivingly connected by means of a worm, indicated in phantom by numeral 6, to a worm gear which is fastened to a shaft. The shaft has attached thereto a pinion gear which meshes with a sector gear, indicated in phantom by numeral 8, of the window regulating mechanism. In order to prevent jamming of the teeth of the pinion gear with the teeth of the sector gear, a resilient coupling is interposed between the worm gear and the pinion gear to permit limited torsional deflection therebetween.

Figure 2:
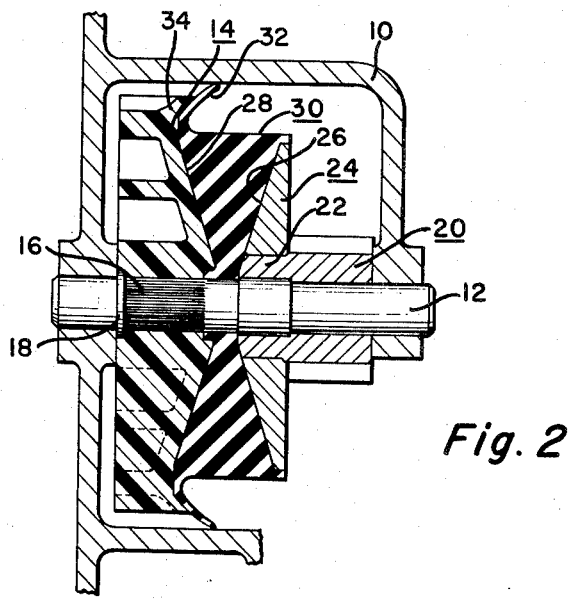
Fig. 2 is a longitudinal sectional view of the gear assembly and housing therefor.

With reference to Figs. 1 and 2 of the drawing, the gear assembly of this invention is disposed in a housing 10 and includes a shaft 12, opposite ends of which are rotatably supported in the housing. A metal or plastic worm gear 14, which, if plastic, may be composed of nylon, is drivingly connected to the shaft by any suitable means, such as splines 16, the worm gear 14 being restrained against axial movement relative to the shaft by a snap ring 18. Accordingly, upon rotation of the worm gear 14 by an electric motor, not shown, rotation is imparted to the shaft 12. A pinion gear 20 is rotatably journaled on the shaft 12 adjacent the other end thereof, the pinion gear 20 having an axially extending integral flange 22. Thus, the driving gear 14 and the driven gear 20 are coaxially mounted on the shaft 12.

A metallic insert 24 having a conical surface 26 is press fitted onto the flange 22 of the pinion gear 20. The worm gear 14 is formed with a complementary conical rear face 28. A cushion 30 of elastomeric material is disposed between the insert 24 and the worm gear 14, the cushion 30 being bonded to both the surface 28 of the worm gear and the surface 26 of the insert. In the illustrated embodiment, the conical shape of the insert 30 facilitates the equalization, or uniform distribution, of stress therethrough upon torsional deflection between the pinion gear 20 and the worm gear 14.

In order to exclude foreign matter from the teeth of the worm gear 14, the cushion 30 is formed with an integral sealing lip 32, which engages the inner periphery of the housing 10. The sealing lip 32 may also function to retain lubricant in the chamber of the housing 10 within which the worm gear 14 is disposed. The sealing lip 32 is partially supported by a conical flange 34 formed as an integral part of the worm gear 14. The outwardly directed conical flange 34, in addition to partially supporting the sealing lip 32, closes the ends of the spaces between the teeth on the worm gear 14 and thereby prevents the entrance of elastomeric material into the spaces during the molding operation. This lateral function of the flange 34 has proven to be highly desirable since it eliminates the necessity of removing the elastomeric material from between the teeth of the worm gear after the molding operation, which removal would be necessary if the flange 34 was not present.

The resultant gear assembly permits limited torsional deflection between the driving gear 14 and the driven gear 20 due to the resiliency of the elastomeric cushion 30. During torsional deflection between the driving and driven gears, the cushion is subjected primarily to sheer stress, and while the cushion 30 constitutes the driving connection between gears 14 and 20, the shaft 12 prevents misalignment therebetween.

From the foregoing, it is apparent that the present invention results in a gear assembly wherein the elastomeric cushion serves a dual function, namely, permits limited torsional deflection between driving and driven gears and effectively forms a seal which excludes foreign matter from the driving gear. In addition, the integral conical flange on the worm gear performs a dual function, namely, to support the sealing lip of the elastomeric cushion and to greatly facilitate the manufacture of the gear and coupling assembly by preventing the entrance of elastomeric material between the teeth of the worm gear during the molding operation.

While the embodiment of the present invention as herein disclosed, constitutes a preferred form, it is to be understood that other forms might be adopted.

What is claimed is as follows:

1. As an article of manufacture, a shaft, a gear drivingly connected to said shaft, said gear having integral means closing the spaces between the gear teeth on one end surface thereof, and a cushion of elastomeric material bonded to said one end surface of the gear, said integral means preventing the entrance of elastomeric material into the spaces between the gear teeth during molding of the elastomeric cushion to said gear surface.

2. As an article of manufacture, a shaft, a gear drivingly connected to said shaft, said gear having an integral flange closing the spaces between the gear teeth on one end surface thereof, and an elastomeric cushion bonded to the end surface of said gear, said flange preventing the entrance of elastomeric material into the spaces between said gear teeth when said elastomeric cushion is bonded to said gear.

3. As an article of manufacture, a shaft, a gear drivingly connected to said shaft, and a cushion of elastomeric material bonded to an end surface of said gear, said elastomeric cushion having an integral sealing lip extending outwardly therefrom.

4. As an article of manufacture, a shaft, a gear drivingly connected with said shaft, said gear having an integral flange closing the spaces between the gear teeth on one end surface thereof, and a cushion of elastomeric material bonded to the end surface of said gear, said elastomeric cushion having an integral sealing lip extending outwardly therefrom, a portion of said sealing lip being bonded to the flange of said gear so as to be at least partially supported thereby.

5. A gear assembly comprising, a driving gear, a shaft to which said driving gear is connected, a driven gear rotatably journalled on the shaft, and a cushion of elastomeric material disposed therebetween and operatively connected to said gears, said cushion including an integral outwardly extending sealing lip and constituting the driving connection between said gears.

6. A gear assembly comprising, a shaft, a first gear drivingly connected to said shaft, a second gear rotatably journaled on said shaft, an insert operatively connected to said second gear, and a cushion of elastomeric material disposed between said first gear and said insert, said cushion being bonded to said first gear and to said insert and including an integral sealing lip extending outwardly therefrom.

7. A gear assembly comprising a housing, a shaft rotatably journaled in said housing, a first gear drivingly connected with said shaft, a second gear rotatably journaled on said shaft, and a cushion of elastomeric material disposed between said gears and operatively connected thereto, said cushion including an integral outwardly extending sealing lip arranged to engage the interior periphery of said housing.

8. The gear assembly set forth in claim 7 wherein said first gear is formed with integral means engaging said sealing lip and constituting at least a partial support therefor.

No references cited.